US012780512B2

(12) United States Patent
Triquet

(10) Patent No.: US 12,780,512 B2
(45) Date of Patent: Nov. 3, 2026

(54) TWO-PART SEAL COMPRISING A CASEIN-BASED LID AND CASEIN-BASED LID

(71) Applicant: SELIG FRANCE, Chazay-d'Azergues (FR)

(72) Inventor: Stéphane Triquet, Écully (FR)

(73) Assignee: SELIG FRANCE, Chazay-d'Azergues (FR)

( * ) Notice: Subject to any disclaimer, the term of this patent is extended or adjusted under 35 U.S.C. 154(b) by 769 days.

(21) Appl. No.: 17/923,798

(22) PCT Filed: Apr. 29, 2021

(86) PCT No.: PCT/FR2021/050744
§ 371 (c)(1),
(2) Date: May 19, 2023

(87) PCT Pub. No.: WO2021/234236
PCT Pub. Date: Nov. 25, 2021

(65) Prior Publication Data

US 2023/0271758 A1 Aug. 31, 2023

(30) Foreign Application Priority Data

May 19, 2020 (FR) ...................................... 2005068

(51) Int. Cl.
*B65D 51/20* (2006.01)
*B32B 9/02* (2006.01)
(Continued)

(52) U.S. Cl.
CPC ................ *B65D 51/20* (2013.01); *B32B 9/02* (2013.01); *B32B 9/045* (2013.01); *B32B 9/046* (2013.01);
(Continued)

(58) Field of Classification Search
None
See application file for complete search history.

(56) References Cited

U.S. PATENT DOCUMENTS

2006/0009611 A1 1/2006 Hayes
2009/0078671 A1* 3/2009 Triquet .................. B65D 53/04 29/592
(Continued)

FOREIGN PATENT DOCUMENTS

EP 0 668 221 A1 8/1995
EP 2 045 194 A1 4/2009
(Continued)

OTHER PUBLICATIONS

Patent Cooperation Treaty, International Search Report dated Aug. 31, 2021 for International Application No. PCT/FR2021/050744 and English Translation, 13 pages.
(Continued)

*Primary Examiner* — Thomas J Kessler
(74) *Attorney, Agent, or Firm* — Fitch, Even, Tabin & Flannery, LLP

(57) ABSTRACT

Disclosed is a two-part seal comprising a substrate affixed to a lid by means of a temporary adhesive, characterized in that the lid comprises a casein- and/or caseinate-based film intended to be in contact with the mouth of said container.

17 Claims, 2 Drawing Sheets

(51) Int. Cl.

| | |
|---|---|
| ***B32B 9/04*** | (2006.01) |
| ***B32B 27/06*** | (2006.01) |
| ***B32B 27/36*** | (2006.01) |
| ***B65D 77/20*** | (2006.01) |

(52) U.S. Cl.

CPC ............ *B32B 27/065* (2013.01); *B32B 27/36* (2013.01); *B65D 77/2024* (2013.01); *B32B 2266/025* (2013.01); *B32B 2307/518* (2013.01); *B32B 2435/02* (2013.01); *B65D 2251/0018* (2013.01); *B65D 2251/0093* (2013.01)

(56) References Cited

U.S. PATENT DOCUMENTS

| | | | |
|---|---|---|---|
| 2012/0103988 A1 | 5/2012 | Wiening | |
| 2019/0135484 A1 * | 5/2019 | Huffer | B32B 38/0004 |

FOREIGN PATENT DOCUMENTS

| | | | | | |
|---|---|---|---|---|---|
| EP | 2 279 962 | A1 | | 2/2011 | |
| FR | 841 136 | A | | 5/1939 | |
| FR | 2 943 322 | A1 | | 9/2010 | |
| FR | 3060542 | A1 | | 6/2018 | |
| JP | 2019064652 | A | * | 4/2019 | |
| JP | 2019064657 | A | * | 4/2019 | |
| WO | 2010/115811 | A1 | | 10/2010 | |
| WO | WO-2012010421 | A1 | * | 1/2012 | C08L 67/02 |
| WO | 2018115732 | A1 | | 6/2018 | |

OTHER PUBLICATIONS

Patent Cooperation Treaty, Written Opinion of the International Searching Authority dated Aug. 31, 2021 for International Application No. PCT/FR2021/050744 and Machine English Translation, 8 pages.

* cited by examiner

[Fig. 1]
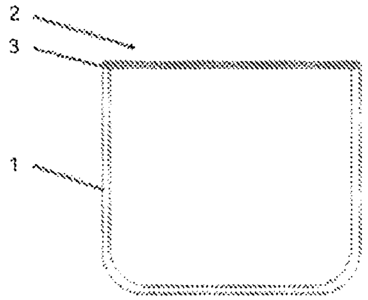
[Fig. 2]
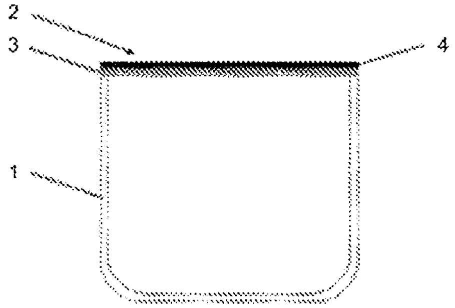

[Fig. 3]
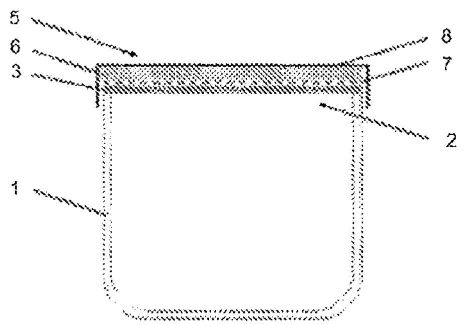
[Fig. 4]
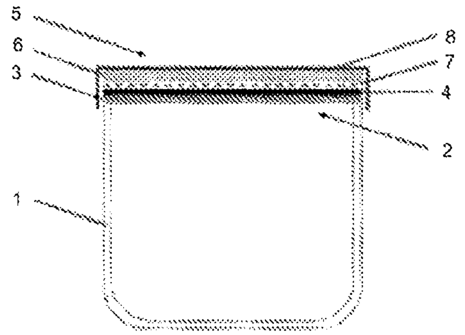

TWO-PART SEAL COMPRISING A CASEIN-BASED LID AND CASEIN-BASED LID

CROSS-REFERENCE TO RELATED APPLICATIONS

This application is a U.S. national phase application filed under 35 U.S.C. § 371 of International Application Number PCT/FR2021/050744, filed Apr. 29, 2021, designating the United States which claims priority from French Application Number FR2005068, filed May 19, 2020.

FIELD

The invention relates to the technical field of means for sealing a container with closure by top or cap, in particular in the field of dry food products such as freeze-dried coffees, without this being limiting. It relates more precisely to a simple lid or a two-part seal comprising such a lid.

BACKGROUND

The sealing of containers with closure by top or cap, prior to their first opening, can be carried out by means of a two-part seal or, in certain cases, a simple lid which can be glued or sealable, on the mouth.

There are also one-piece seals made up of an optionally foamed substrate. When it is a foam, it consists of polypropylene (PP), polyethylene (PE) or polyethylene terephthalate (PET) foams, optionally laminated with PP, PE or polyethylene terephthalate (PET) films. The function of these seals is to ensure the sealing of the packages mainly with respect to the content, which may optionally be liquid, but also with respect to oxygen, and with respect to flavors and odors.

These seals are generally delivered to the cap or top manufacturer. The manufacturer inserts them in the bottom of the cap or top and delivers them to the end customer. The latter fills the containers (vial, bottle, jar, etc.) which it then closes via the cap or the top provided with its seal. These seals are not intended to be sealed or glued onto the mouth and are not affected by the invention.

A two-part seal consists of a lid placed over the entire periphery of the upper rim of the neck of the container or mouth, thereby isolating the container from the outside, as well as of a generally thicker substrate, inserted, without being otherwise attached, in the bottom of the top. Prior to the first opening of the container, the substrate and the lid can be attached to one another via a temporary adhesive.

The role of the lid is firstly to confer a tamper-proof nature to the container before the first opening. Additionally, it provides the primary seal with respect to the outside. Furthermore, it must develop certain properties of compatibility with the contents that it is supposed to isolate and for example be of food quality whenever the contents are food.

The substrate, for its part, is intended to absorb the tolerances between the bottom of the cap and/or the top and the upper part of the neck of the container, and additionally, to ensure the secondary sealing once the lid has been completely or partially removed. It is therefore capable of ensuring a certain compression with memory effect precisely to allow these tolerances to be absorbed.

In practice, the seal is inserted in the bottom of the cap or of the top. Once the container has been filled, the top or cap equipped with the seal is screwed or snap-fit onto the container. The sealing part of the seal is then in contact with the mouth.

When the container is opened for the first time, the substrate inserted in the bottom of the top detaches from the lid that has remained sealed on the mouth. It is only then that the lid is removed by the consumer; the seal, in the closed position of the container, then only being provided by the substrate part of the seal pressing by compression on the mouth.

The sealing of the lid on the mouth is carried out by bonding or heat-sealing by induction by means of a heat-sealing film or varnish.

In the case of bonding, this is conventionally carried out by means of an adhesive that is compatible with the mouth and the lower face of the lid. To allow the adsorption of the water contained in the adhesive, the lid generally contains at least one paper layer, which requires the presence of an additional element, which has an impact on the production cost. Furthermore, and above all, there is always a risk of the adhesive, which is applied to the mouth of the jar, penetrating into the container even though it is a food adhesive.

In the case of heat-sealing, this is made possible by the combined action of a conductive material, inserted into the thickness of the seal, which, under the effect of electric induction, heats up, resulting in the softening of the sealing film or varnish on the mouth. The conductive material can be inserted either into the substrate or into the lid. Most often, it is inserted into the thickness of the lid. In practice, it has a thickness of at least 12 micrometers to ensure the conduction of heat.

The heat-sealing film or varnish is made of a material of the polyolefin type, selected from the group comprising EVA, polyethylene, polypropylene or PET, of the hot-melt type or else of the terpolymer or ionomer type. Generally, the constituent material of the heat-sealing film is selected based upon the nature of the jar. The heat-sealing film can be a single-layer film applied to the lower face of the lid by extrusion. It may also be a bilayer film (an actual heat-sealing lower layer and a binding upper layer) applied to the lower face of the lid by co-extrusion.

Documents EP 2045 194 A1 and WO 2010/115811 describe two-part seals the lid part of which incorporates an aluminum sheet as conductive material.

The disadvantage of the prior art lies mainly in the fact that the layer of conductive material, necessary for heat-sealing, complicates the recycling of the lid due to its considerable thickness and thus the amount of metal required. Indeed, during the recycling process, the conductive material needs to be separated from the other components of the lid and of the cap or of the top given their different composition. This thus involves substantial costs for treating the lids as well as substantial recycling time.

In certain cases, in particular for certain products or markets, the presence of the substrate is not necessary, such that only the lid is used. This is especially the case for so-called “service caps”, in which the presence of a substrate is incompatible with the shape of the cap. It is also sometimes the case for developing countries, where price has a strong impact. Under these conditions, even if the seal is not optimal, sealing by a simple lid remains sufficient.

Document EP 2279962 A1 discloses a method for sealing a lid on a glass container. The objective is to improve the tightness of the seal due especially to the imperfection of the glass mouth and to improve the sealing force.

To do this, the mouth is treated with a casein-based solution before applying an aluminum layer covered with a sealing film. The proposed solution, while it makes it possible to solve the problem of sealing, does not solve the problem of recycling.

Document FR 841 136 A describes a glassine paper intended to close jelly jars, without it being envisaged to cover the glassine paper by means of a top or cap. It is indicated that the consumer applies a casein-based layer on the glassine paper by soaking it in milk in order to cause said glassine paper to adhere to the mouth of the jar.

BRIEF DESCRIPTION OF THE DRAWINGS

FIG. 1 is a schematic depiction illustrating a container sealed with a lid according to the invention, wherein the lid comprises only the casein film.

FIG. 2 is a schematic depiction similar to that of FIG. 1, wherein the lid comprises the casein film and a reinforcing film.

FIG. 3 is a schematic depiction similar to that of FIG. 1, except that the container is sealed with a two-part seal according to the invention.

FIG. 4 is a schematic depiction similar to that of FIG. 2, wherein a seal is affixed to the lid.

DETAILED DESCRIPTION

The first problem that the invention proposes to solve is that of developing a seal or lid which can be sealed onto the mouth of a container without requiring heating or glue, which, even if they are suitable for food contact in the current legislative framework, might be called into question later due to regulatory changes.

The second problem that the invention proposes to solve is that of ensuring that the caps, tops, seals and lids are recyclable according to a common circuit, that is that they can be recycled together, without needing to separate the top from the lid or the seal and then each of the elements that make up the lids and seals.

The third problem that the invention proposes to solve is that of proposing seals or lids that are partially biodegradable.

To this end, a lid has been developed for sealing a container with closure by top or cap. According to the invention, the lid comprises a casein- and/or caseinate-based film intended to be in contact with the mouth of said container. Advantageously, the casein- and/or caseinate-based film is provided in the form of an extruded film.

In the rest of the description, the casein- and/or caseinate-based film is referred to as "casein film".

The term "caseinate" is mainly understood to mean the sodium, potassium, calcium or magnesium salts of casein and the mixtures thereof. Unlike caseins, which are hydrophobic, caseinates are hydrophilic and thus water-soluble.

[0025] Casein is a milk protein that is not very soluble in water. It is advantageously obtained either by acidification (acid casein), or by enzymatic attack (rennet casein). In the context of the invention, caseins and caseinates are animal proteins derived from milk. The term "protein material" is therefore intended to mean substantially the caseins, the caseinates and the mixtures thereof.

The applicant had the idea of applying the casein films conventionally used in the field of packaging to the field of lids used in caps or tops in order to solve the previously mentioned problems.

More specifically, the applicant has observed that the casein film had the triple advantage at least:

of being sealable alone, meaning that it can be sealed onto the mouth of a container at room temperature without requiring the addition of an adhesive or the presence of a conductive material whose thickness is incompatible with an optimal recycling circuit, of being biodegradable.

More specifically, when the metal layer is present, it has a thickness such that it cannot fulfill a heat induction function. In practice, it has a thickness of less than 12 micrometers, preferably less than 10 micrometers, in practice only a few angstroms. Under these conditions, the metal layer only has a barrier function. It also has the advantage of maintaining a metalized appearance of the lid for the consumer.

In a particular embodiment, the lid totally lacks a metal layer.

As mentioned, the film may contain casein, caseinate or a mixture of both.

In practice, the film comprises:

at least one caseinate and/or at least one casein, the weight of which represents from 40 to 90% of the weight of the film, more advantageously from 50 to 85% and even more advantageously from 60 to 70% at least one plasticizer, the weight of which represents from 5 to 50% of the weight of the film, more advantageously from 10 to 40% and even more preferentially from 15 to 25%.

Advantageously, the weight ratio between the casein and the caseinate is between 5/95 and 95/5, preferably between 20/80 and 80/20 and even more preferentially between 40/60 and 60/40.

In practice, the plasticizer may be selected from the group comprising water, glycerol, sorbitol, mannitol, maltitol, ethylene glycol and the mixtures thereof.

In a preferred embodiment, the film is an extruded film. In another embodiment, the film is obtained by coating and then drying the film thus coated.

Preferentially, the plasticizer is water and/or glycerol.

The sealability of the film is granted by the water-soluble nature of casein, which generates a tacky effect of the film. In other words, the film can be bonded directly onto the mouth, simply by moistening the area to be bonded by means of an aqueous solution.

In a particular embodiment, the lid consists only of the casein- and/or caseinate-based film, advantageously an extruded film.

To reinforce the mechanical characteristics of the film, the lid further comprises a reinforcing film.

The reinforcing film is advantageously applied over the entire surface of the casein film, in order to overcome any mechanical fragility thereof. The reinforcing film can also serve as a substrate for printing. Logically, the reinforcing film is applied to the face of the casein film opposite that facing the mouth. The reinforcing film is in practice affixed to the casein film either by moistening the reinforcing film or the casein film by means of an aqueous solution, or by means of a binder such as for example a two-component isocyanate-hydroxyl adhesive.

Preferentially, the reinforcing film is made of a material advantageously selected from the group comprising polyester (PET), biaxially oriented polypropylene, biaxially oriented polyimide and biaxially oriented PET, polyester, PE (polyethylene). Its thickness is advantageously between 5 and 100 μm, advantageously between 4 and 40 μm. In certain cases, the reinforcing film may be metallized without however granting it heat-induction characteristics. Only the barrier function is sought.

In practice, the lid has a thickness of between 20 and 200 μm, preferably between 30 and 120 μm.

In an improved embodiment, the lid comprises a tab arranged as an extension of the reinforcing film and/or the casein film.

The purpose of this tab is to facilitate the removal of the lid.

The invention also relates to a two-part seal comprising a substrate affixed to a lid as described above by means of a temporary adhesive.

The substrate can be made of any type of compressible material with recovery memory, especially expanded polyethylene or expanded polypropylene, optionally provided on at least one of its two faces with a film of polypropylene or polyethylene in order to grant it a certain rigidity. It can also be made of paper or cardboard. In practice, the envisaged substrates have a thickness of between 0.5 and 4 mm, advantageously between 0.8 and 2 mm.

Regarding the temporary attachment between the substrate and the lid, this can be obtained by means of a temporary adhesive applied in the form of a film, preferably extruded or co-extruded, each of the two faces of the layer having a different tackiness, the tackier face being applied to the lower surface of the substrate, while the less tacky face is applied to the upper face of the lid. In practice, such a film is polymer-based, generally synthetic, and selected carefully by a person skilled in the art, so as to obtain the sought properties of differential bonding. Such polymers are for example polymers or co-polymers based on acetate, acrylate, polyethylene, etc. The temporary adhesive may also be provided in the form of a layer of wax.

The lid and the two-part seal of the invention are more particularly suitable for sealing a container with closure by top or cap containing dry products.

FIG. 1 is a schematic depiction illustrating a container sealed with a lid according to the invention, wherein the lid comprises only the casein film.

The film may be manufactured by any known means, in particular by extrusion, advantageously blown-film extrusion.

The lid of the invention is intended for closing a container such as bottles or jars by top or cap. In the following examples, the jar (1) is intended to be closed with a top (8).

Referring to FIG. 1, a jar (1) is depicted sealed with a lid (2) according to the present invention. In this first variant, the lid (2) comprises only a casein-based film (3) described above arranged facing the mouth of the jar.

The film is sealed by moistening the mouth of the jar and then applying the casein-based film directly onto the mouth of the jar.

According to a second variant, illustrated by FIG. 2, the lid (2) comprises the casein-based film (3) and a reinforcing film (4).

The reinforcing film (4) is in this example made of biaxially oriented PET. Its thickness is 35 μm.

The casein-based film (3) and the reinforcing film (4) overlap over their entire surface, the lid (2) being positioned on the mouth of the jar (1) such that the casein-based film (3) is facing the mouth of the jar (1).

Also according to FIG. 2, the casein-based film (3) and the reinforcing film (4) are attached to one another by wetting the casein-based film.

Referring to FIGS. 3 and 4, the lid (2) is affixed to a seal (5), by virtue of a temporary adhesive.

The adhesive film (7) allowing the temporary adhesion between the substrate layer (6) of the seal (5) and the lid (2) is selected such that the assembly force between the substrate layer (6) and the lid (2) is less than both the strength of resistance of the casein-based film (3) (also referred to as consistency force) and the bonding force of the casein-based film (3) on the mouth of the container (1).

The adhesive film (7) is in the form of a co-extruded film, each of the two faces of which have a different tackiness, the tackier face being applied to the upper surface of the lid (2) while the less tacky face is applied to the lower face of the substrate layer (6). In practice, this adhesive film (7) is a polymer based on acrylate and polyethylene.

The inner perimeter of the top (8) also has a ring (not shown) making it possible to keep the substrate layer (6) at the bottom of the top (8) after opening. When first opening the container (1), the removal of the top (8) causes the separation of the substrate layer (6) (which then remains in the bottom of the top (8) by virtue of the presence of the ring arranged on the inner periphery of said top (8)) with respect to the lid (2) which remains on the mouth of the container (1). The top (8) is made of any suitable material, preferentially polymer.

The substrate layer (6) can be made of any type of compressible material with recovery memory, especially expanded polyethylene or expanded polypropylene, optionally provided on at least one of its two faces with a film of polypropylene or polyethylene in order to grant it a certain rigidity. In practice, the substrate layer (6) has a thickness of 2-mm.

FIG. 3 depicts the substrate layer (6) attached to the upper face of the casein-based film (3) which itself alone constitutes the lid (2), while FIG. 4 depicts the substrate layer (6) attached to the upper face of the reinforcing film (4); in this case the lid (2) consists of the reinforcing film (4) and the casein-based film (3).

Referring to FIGS. 1 to 4, the casein-based film (3) has a thickness of 50 μm. The reinforcing film (4), in turn, has a thickness of 35 μm.

The invention and the resulting benefits are clear from the foregoing description.

It is noted in particular that the adhesive or most of the metal can be replaced with casein, making it possible, respectively, to anticipate potential regulatory problems relating to the use of glue and to recycle all of the elements that make up the top or cap, as well as the seal and the lid, in the same circuit.

The invention claimed is:

1. A two-part seal for use with a container top, the two-part seal comprising a substrate affixed to a lid by means of a temporary adhesive, characterized in that the lid comprises a casein- and/or caseinate-based film intended to be in contact with a mouth of a container, wherein the two-part seal is free of a metal layer, and wherein the substrate separates from the lid when the container top is removed from the container allowing the lid to remain on the container, wherein the two-part seal can be sealed on the container without requiring heat.

2. The seal according to claim 1, wherein the lid further comprises a reinforcing film.

3. The seal according to claim 2, wherein the reinforcing film is applied to the face of the casein- and/or caseinate-based film opposite that facing the mouth.

4. The seal according to claim 1, wherein the reinforcing film is made of a material selected from the group comprising polyester, biaxially oriented polypropylene, biaxially oriented polyamide and biaxially oriented PET.

5. The seal according to claim 1, wherein the lid comprises a tab arranged as an extension of the reinforcing film and/or of the casein- and/or caseinate-based film.

6. The seal according to claim 1, wherein the casein- and/or caseinate-based film comprises:

at least one caseinate and/or at least one casein, the weight of which represents from 40 to 90% of the weight of the film;

at least one plasticizer, the weight of which represents from 5 to 50% of the weight of the film.

7. The seal according to claim 6, wherein the plasticizer is selected from the group comprising water, glycerol, sorbitol, mannitol, maltitol, ethylene glycol and the mixtures thereof.

8. The seal according to claim 1, wherein the substrate is made of a compressible material with recovery memory.

9. A lid for sealing a container with a closure by top or cap, the lid comprising:

a casein- and/or caseinate-based extruded film intended to be in contact with the mouth of said container and seal the container; and a reinforcing film applied to a face of the casein- and/or caseinate-based extruded film opposite the mouth of the container, the reinforcing film including at least one of polyester, biaxially oriented polypropylene, biaxially oriented polyamide, biaxially oriented PET, or a combination thereof, wherein the lid can be sealed on the container without requiring heat.

10. The lid according to claim 9, further comprising a tab arranged as an extension of the reinforcing film and/or of the casein- and/or caseinate-based film.

11. The lid according to claim 9, wherein the casein- and/or caseinate-based extruded film comprises:

at least one caseinate and/or at least one casein, the weight of which represents from 40 to 90% of the weight of the casein- and/or caseinate-based extruded film;

at least one plasticizer, the weight of which represents from 5 to 50% of the weight of the film.

12. The lid according to claim 11, wherein the plasticizer is selected from the group comprising water, glycerol, sorbitol, mannitol, maltitol, ethylene glycol and the mixtures thereof.

13. A lid for sealing a container with closure by top or cap, wherein the lid comprises a casein- and/or caseinate-based film intended to be in contact with the mouth of said container to seal the container, said film comprising:

at least one caseinate and/or at least one casein, the weight of which represents from 60 to 70% by weight of the film;

at least one plasticizer, the weight of which represents from 10 to 40% by weight of the film, wherein the lid can be sealed on the container without requiring heat.

14. The lid according to claim 13 further comprising a reinforcing film.

15. The lid according to claim 14 wherein the reinforcing film is applied to the face of the casein- and/or caseinate-based film opposite that facing the mouth.

16. The lid according to claim 14 wherein the reinforcing film is made of a material selected from the group comprising polyester, biaxially oriented polypropylene, biaxially oriented polyamide and biaxially oriented PET.

17. The lid according to claim 13, wherein the plasticizer is selected from the group comprising water, glycerol, sorbitol, mannitol, maltitol, ethylene glycol and the mixtures thereof.

* * * * *